US009933787B2

(12) United States Patent
Story (10) Patent No.: US 9,933,787 B2
(45) Date of Patent: Apr. 3, 2018

(54) METHOD AND SYSTEM FOR DETERMINING OPTIMIZED TRAVEL PATH FOR AGRICULTURAL IMPLEMENT ON LAND WITH OBSTACLE

(71) Applicant: 101227980 SASKATCHEWAN LTD., Saskatoon, Saskatchewan (CA)

(72) Inventor: Lane Story, Saskatoon (CA)

(73) Assignee: 101227980 SASKATCHEWAN LTD., Saskatoon (CA)

( * ) Notice: Subject to any disclaimer, the term of this patent is extended or adjusted under 35 U.S.C. 154(b) by 633 days.

(21) Appl. No.: 14/264,818

(22) Filed: Apr. 29, 2014

(65) Prior Publication Data

US 2014/0324345 A1 Oct. 30, 2014

Related U.S. Application Data

(60) Provisional application No. 61/818,760, filed on May 2, 2013.

(30) Foreign Application Priority Data

Apr. 29, 2013 (CA) .................................. 2814599

(51) Int. Cl.
  *G05D 1/02* (2006.01)
  *A01B 69/00* (2006.01)
(52) U.S. Cl.
  CPC ......... *G05D 1/0278* (2013.01); *A01B 69/007* (2013.01); *G05D 1/0217* (2013.01); *G05D 1/0219* (2013.01); *G05D 1/0274* (2013.01)

(58) Field of Classification Search
  CPC .... A01C 21/005; G05D 1/0219; A01B 67/00; A01B 79/005; A01B 69/00; E02F 9/2045
  See application file for complete search history.

(56) References Cited

U.S. PATENT DOCUMENTS

| 6,934,615 B2 * | 8/2005 | Flann ................... A01B 69/008 172/2 |
| 2008/0103690 A1 * | 5/2008 | Dix ...................... A01B 69/008 701/516 |
| 2008/0103694 A1 * | 5/2008 | Dix ...................... A01B 69/008 701/425 |

(Continued)

*Primary Examiner* — Thomas G Black
*Assistant Examiner* — Ana D Thomas
(74) *Attorney, Agent, or Firm* — King & Schickli, PLLC (57) ABSTRACT

Methods for identifying and addressing inefficiencies in agricultural production activities caused by physical obstacles in the target field. A method and system is disclosed for determining an optimized travel path for an agricultural implement, specifically in the presence of an obstacle or obstruction such as an access road, oil well or public utility infrastructure. The method may further comprise means for determining the impact of such obstacle or obstruction on production from the agricultural land, as well as means for determining an optimized implement type and configuration. One or more travel path plans may be generated for selection of one by an agricultural producer. The method may also comprise means for determining an optimized location or position within a plot of land for an obstacle or obstruction that has not yet been constructed, as a way to reduce or alleviate the negative impact of such obstacle or obstruction on production from the plot of land.

11 Claims, 8 Drawing Sheets

(56) References Cited

U.S. PATENT DOCUMENTS

2010/0063735 A1* 3/2010 Kindo ................. B60W 40/072
                                                    701/300
2011/0153136 A1* 6/2011 Anderson ............ G05D 1/0219
                                                    701/25

* cited by examiner

METHOD AND SYSTEM FOR DETERMINING OPTIMIZED TRAVEL PATH FOR AGRICULTURAL IMPLEMENT ON LAND WITH OBSTACLE

FIELD OF THE INVENTION

The present invention relates to methods of agricultural production, and specifically to methods for enhancing production through determination of optimized work plans.

BACKGROUND OF THE INVENTION

Agricultural activity such as seeding or harvesting is commonly undertaken using selected implements and driving or pulling such implements across the land in a sequence of generally parallel rows, with only modest overlap dictated primarily by the implement itself. It is obvious that the most optimized and beneficial situation is one in which the land can be farmed in a series of straight, uninterrupted rows, back and forth from one end of the field to the other as one works across the field. No wasted implement movement is necessary, and no energy or time is therefore wasted.

However, it is well known in the art of production from agricultural land that physical obstacles and obstructions are common and that the presence of such can negatively impact production activities. For example, natural obstacles such as water bodies can block a farmer's ability to move the selected implement in straight, uninterrupted rows, instead forcing the farmer to redirect the implement around the obstacle and thereby introduce inefficiencies and potential waste of time and energy resources, such as due to going over the same patch of land two or more times as you work around the obstacle from different angles. It can be challenging to determine a travel path for the selected implement that covers the land as efficiently as possible so as to reduce resource waste.

In addition, man-made obstacles are increasingly making an impact on agricultural production. Hydrocarbon production and pipeline facilities, power and communication utility infrastructure, and various other constructed obstacles and obstructions obviously impact the ability to produce from the land that is being taken up, but with the added presence of access roads, berms and the like there is a heightened impact on the ability to efficiently farm the remaining land, and the negative production impact is not limited to simply the exact patch of land that has been removed from agricultural use. As is the case with natural obstacles, redundant implement travel can result from the irregular remaining land that must be acted upon, with the resultant resource waste.

While producers may attempt, with varying degrees of success, to determine an optimized way to farm the remaining land in the now-disturbed field, it is a challenging task that commonly results in a less-than-optimal approach. The results are often unsatisfactory, and efforts to compensate farmers for lost production are hampered by uncertainty around the quantum of loss.

What is needed is a method for assessing the impact of an obstacle on agricultural activities and determining a way to optimize production.

SUMMARY OF THE INVENTION

The present invention is accordingly primarily directed to a method for optimizing the travel path of an agricultural implement, such that a producer can attempt to reduce the inefficiencies arising from an in-field obstacle or obstruction, although other means of optimizing the workflow are disclosed herein.

According to a first aspect of the present invention, then, there is provided a method for determining an optimized travel path for an agricultural implement with respect to a selected area of agricultural land comprising a physical obstacle thereon, the method comprising the steps of:
a. selecting a property;
b. identifying dimensions of the property;
c. identifying dimensions of an obstacle on the property and the location of the obstacle on the property;
d. determining an area of the property outside the obstacle that is available for agricultural activity;
e. selecting an agricultural implement suitable for a desired type of agricultural activity on the property, the agricultural implement having defined operating parameters;
f. determining at least two potential travel paths for the agricultural implement to cover the under the operating parameters, each potential travel path having a distance; and
g. selecting the potential travel path having the shortest distance.

In some exemplary embodiments of the first aspect, the step of determining the least two potential travel paths for the agricultural implement to cover the area comprises simulating a plurality of potential travel paths using computer software, the computer software configured to determine possible travel paths for a given area. Rather than determining at least two potential travel paths and then selecting the shortest one, computer software could alternatively be employed to calculate a shortest travel path such that selection is not required.

According to a second aspect of the present invention, there is provided a method for determining impact of a physical obstacle on agricultural production from a plot of land, the method comprising the steps of:
a. identifying dimensions of the plot of land including the physical obstacle, thereby defining a pre-disturbance area of the plot of land;
b. selecting an agricultural implement suitable for a desired type of agricultural activity on the plot of land, the agricultural implement having defined operating parameters;
c. determining a first shortest possible travel path for the agricultural implement to cover the pre-disturbance area under the operating parameters, the first travel path having a first distance;
d. identifying dimensions of the obstacle and the location of the obstacle on the plot of land, thereby defining a disturbance area;
e. subtracting the disturbance area from the pre-disturbance area, thereby defining a post-disturbance area of the plot of land suitable for agricultural production;
f. determining a second shortest possible travel path for the agricultural implement to cover the post-disturbance area under the operating parameters, the second travel path having a second distance; and
g. comparing the first distance and the second distance to determine an impact of the obstacle on agricultural production from the plot of land.

In some exemplary embodiments of the second aspect, the steps of determining the first and second travel paths comprise simulating the first and second travel paths using computer software, the computer software configured to determine a shortest possible travel path for a given area.

Where a plurality of agricultural activities are required on the plot of land, the method according to the second aspect of the present invention may comprise the further steps before step b. of:

selecting a crop intended for the agricultural production;

determining the number and type of agricultural activities required for the selected crop; and repeating steps c. through g. for each agricultural activity for the selected crop.

Methods according to the present invention, and particularly but not exclusively with respect to the second aspect of the present invention, may include further steps directed to determining the financial impact of the presence of the obstacle. For example, the method may further comprise assigning a financial cost and financial benefit for the agricultural activity, to enable determination of suitable compensation for the impact of the physical obstacle on agricultural production from the plot of land.

According to a third aspect of the present invention, there is provided a method for determining an optimized agricultural implement for use on a plot of land, the method comprising the steps of:
a. selecting a plot of land;
b. identifying dimensions of the plot of land;
c. identifying dimensions of an obstacle on the plot of land and the location of the obstacle on the plot of land;
d. determining an area of the plot of land outside the obstacle that is available for agricultural activity;
e. selecting a first agricultural implement suitable for a desired type of agricultural activity on the plot of land, the first agricultural implement having first defined operating parameters;
f. determining a shortest possible first travel path for the first agricultural implement to cover the area under the first operating parameters, the first travel path having a first distance;
g. selecting a second agricultural implement suitable for the desired type of agricultural activity on the plot of land, the second agricultural implement having second defined operating parameters;
h. determining a shortest possible second travel path for the second agricultural implement to cover the area under the second operating parameters, the second travel path having a second distance; and
i. comparing the first and second distances to select the agricultural implement with the travel path having the shortest distance.

In some exemplary embodiments of the third aspect, the steps of determining the first and second travel paths comprise simulating the first and second travel paths using computer software, the computer software configured to determine possible travel paths for a given area.

According to a fourth aspect of the present invention, there is provided a method for determining an optimized position within an agricultural plot of land for an obstacle, the method comprising the steps of:
a. selecting a plot of land;
b. identifying dimensions of the plot of land;
c. identifying dimensions of an obstacle for positioning on the plot of land;
d. selecting an agricultural implement suitable for a desired type of agricultural activity on the plot of land, the agricultural implement having defined operating parameters;
e. determining a plurality of potential obstacle positions on the plot of land;
f. for each of the plurality of potential obstacle positions, generating an area plan of the plot of land including the obstacle in the potential obstacle position;
g. for each of the plurality of area plans, determining a farmable region outside the obstacle that is available for agricultural activity;
h. for each farmable region in each of the plurality of area plans, determining a shortest possible travel path for the agricultural implement to cover the farmable region under the operating parameters, each travel path having a respective distance; and
i. comparing the respective distances for all of the area plans and selecting the area plan providing a travel path with the shortest distance.

In some exemplary embodiments of the fourth aspect, the step of determining a shortest possible travel path for each farmable region of each area plan comprises simulating the travel paths using computer software, the computer software configured to determine possible travel paths for a given area.

There can be more than one obstacle, and they may be natural or man-made, and the dimensions of the obstacle can include land adjacent the obstacle that is unfarmable with the selected agricultural implement as a result of the presence and location of the obstacle. Identifying the dimensions of the property or plot of land and the obstacle can be achieved by either primary measurement or by accessing a record of pre-measured dimensions, which record could be maintained in a database or similar storage medium. The location of the obstacle can be determined in a like manner, and can include use of GPS/GIS technology.

The operating parameters of the agricultural implement can include an anticipated overlap for adjacent rows of a travel path and an anticipated travel path width for the particular agricultural implement, to provide a more accurate travel path plan.

A detailed description of exemplary embodiments of the present invention is given in the following. It is to be understood, however, that the invention is not to be construed as being limited to these embodiments.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

The present invention is directed to methods for identifying and addressing the impact on agricultural production of a physical obstacle—natural or man-made—that is located in a field. Reference is made to pre-disturbance and post-disturbance land areas, which respectively represent the farmable land before and after introduction of the obstacle. In the case of a man-made obstacle, the method may address a situation where the obstacle is already in place, or it may address a situation where the obstacle has yet to be positioned in the field. One common feature of these methods is the determination of a post-disturbance farmable area, and how one can optimize production by analysis of that farmable area and determination of an implement travel path having the shortest distance and therefore a reduced impact on production.

Four such exemplary methods are described herein to illustrate certain modes of the present invention.

Determining an Optimized Travel Path for an Agricultural Implement

Figure 1:
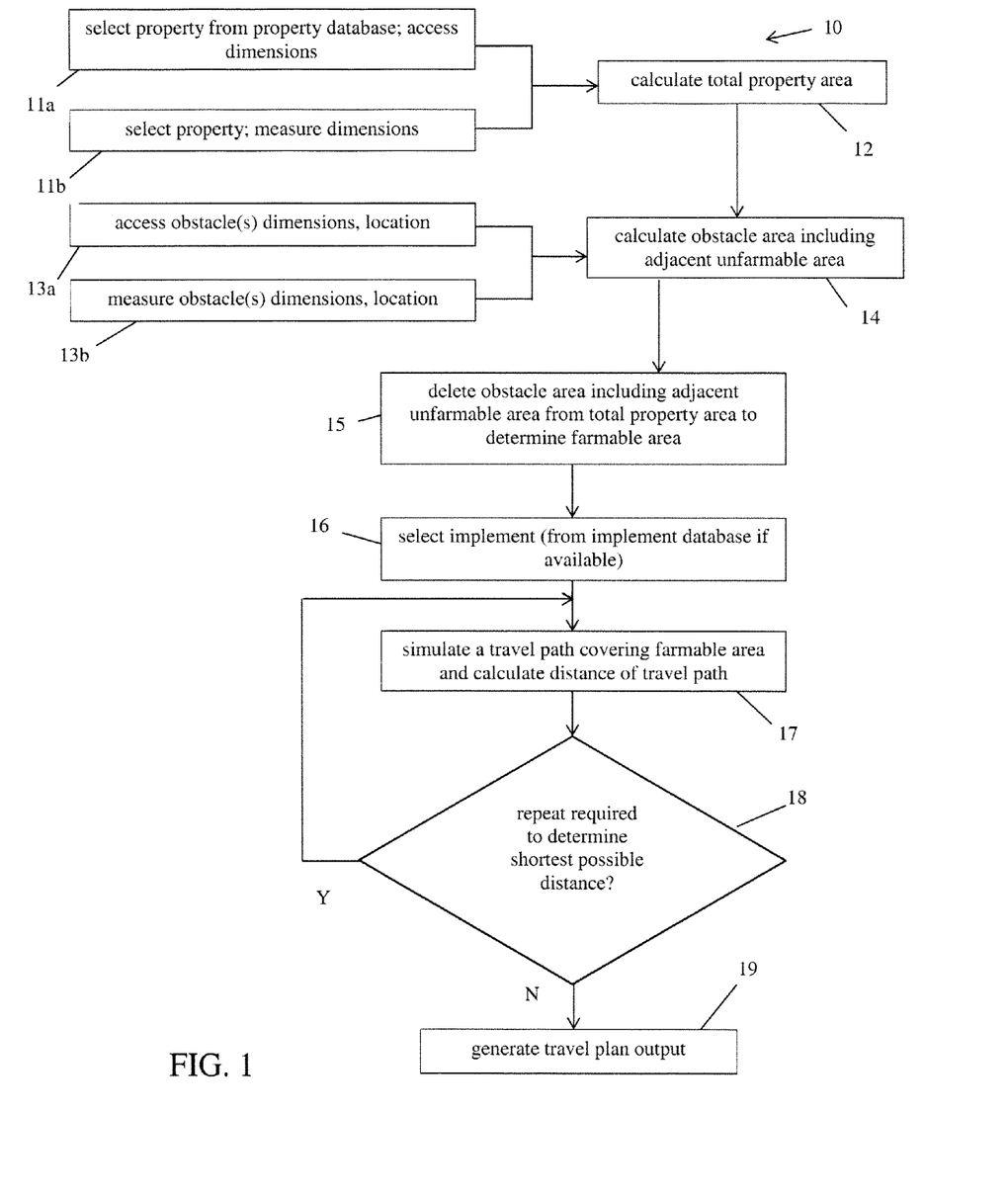
FIG. 1 is a flowchart illustrating a first method in accordance with the present invention.

Turning to FIG. 1, a method 10 is disclosed for determining an optimized travel path for a selected agricultural implement on post-disturbance land. The method 10 begins with selection of a target property at step 11a or 11b; step 11b is where the property information including field dimensions is located in a database, and step 11b is where the property information must be measured by the producer. Once the dimensions have been located or acquired, the total property area is calculated at step 12. Next, the producer either accesses (step 13a) or measures (step 13b) the dimensions of the particular obstacle under consideration and its location within the total property area, and thus calculates the area of the obstacle itself at step 14. Note that an obstacle may create unfarmable land adjacent its margins depending on its position within the total property area, and step 14 includes determination of this additional unfarmable area, as well.

Once the total property area and obstacle area have been calculated, which calculation can be undertaken manually or by a suitable software program (as would be known to those skilled in the art), the obstacle area is deleted from the total property area at step 15 to produce a representation of a farmable area portion of the total property area; this is the land that can actually be fanned in the presence of the obstacle (whether that obstacle is currently present or is still under planning or construction).

At step 16, an implement is selected that is suitable for farming the farmable area. As will be clear to those skilled in the art, different types and sizes of implements will be appropriate for different proposed agricultural activities on the land, and different sizes (and particularly widths) of implements will have an impact on optimization of the travel path in the presence of the obstacle. The implement information can be stored in a database and accessed via appropriate software, or it can be manually accessed.

Once a suitable implement has been selected, the method proceeds at step 17 with simulation of a travel path for the selected implement, the travel path selected such that it covers the entire farmable land to the extent possible with the selected implement in the presence of the obstacle. As the goal of the method 10 is to optimize the production in the presence of the obstacle, determining a travel path having the shortest distance—and therefore the most optimized solution based on factors such as use of time, crop inputs and the like—is the desired end.

It is within the skill of programmers to create software comprising an algorithm allowing determination of a shortest possible route to cover a specific area. It is believed that such software could be easily modified to allow simulation testing to determine a shortest possible travel path given the farmable area, size and location of the obstacle, and size of the implement. However, the above method including simulations can be practiced manually, and both manual and software-derived simulation activities are intended to be included within the scope of the present invention.

Figure 2A:
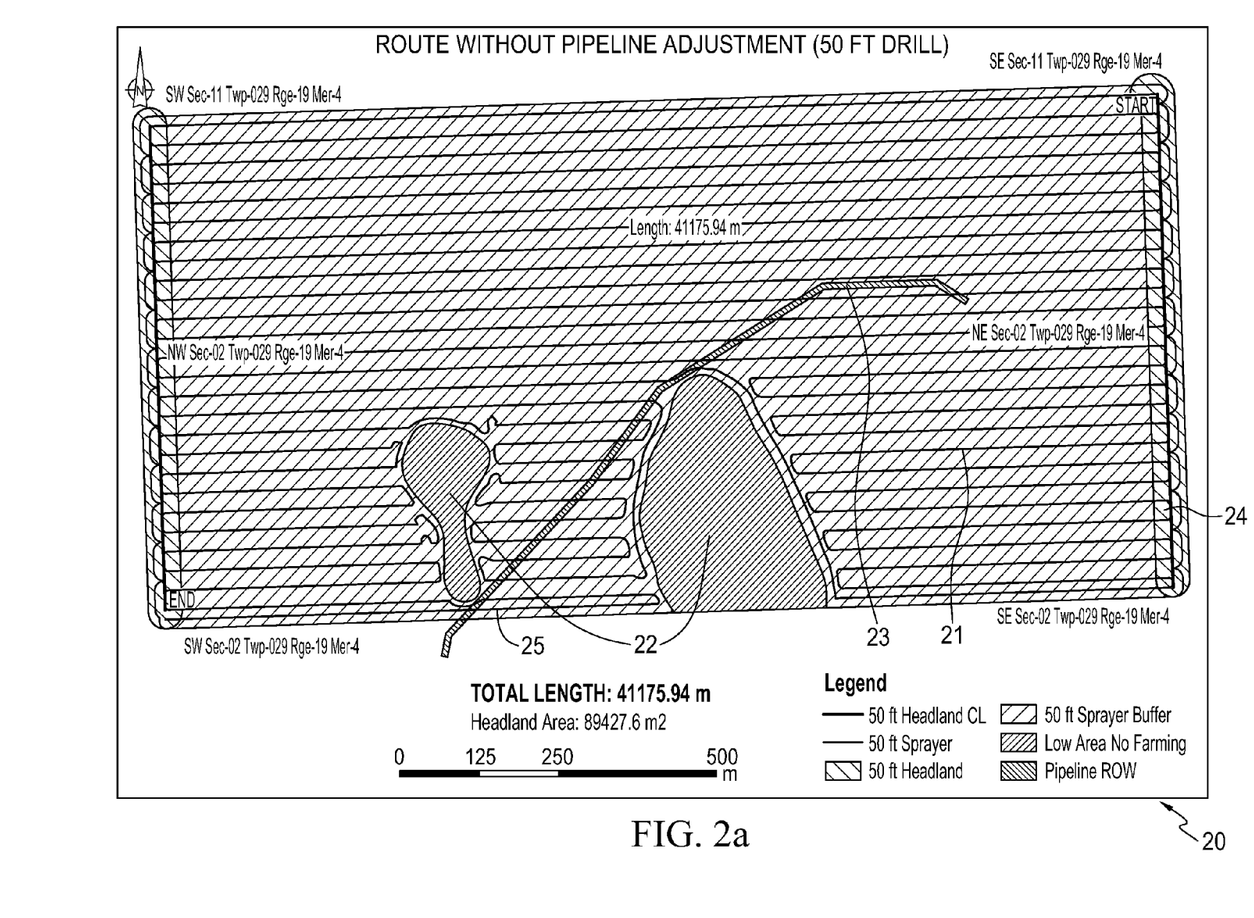
FIG. 2a is a sample map illustrating a pre-disturbance travel path.
Figure 2B:
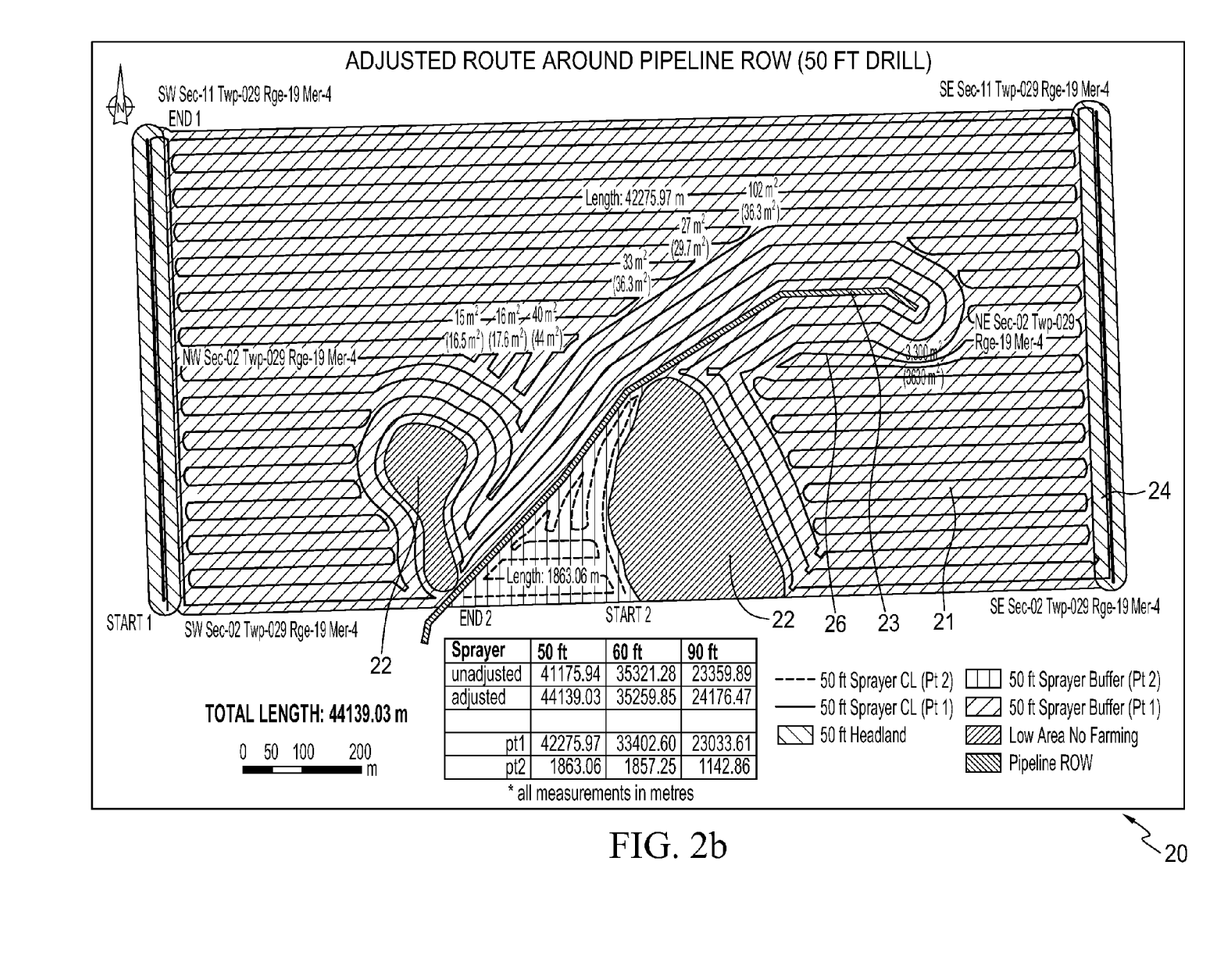
FIG. 2b is a sample map illustrating a post-disturbance travel path.

In the event that multiple simulations may be required in order to determine a shortest travel path distance, step 18 allows for a looping back to allow further simulations with alternate travel paths. Such looping may be part of both manual and software-driven simulation activities. At a certain stage, either after a pre-determined number of simulations or once a threshold travel distance is achieved, a travel path is selected and a travel plan output is generated at step 19. The travel plan output may be a hard-copy map for use by a farmer, or it may be a set of electronic instructions suitable for use in navigational systems found in certain conventional implements. The goal is to provide a map or set of instructions that the farmer can use in optimizing production activities on the post-disturbance land. An example of a map showing an optimized travel path is shown in FIG. 2b, which is described in detail below.

Figure 3A:
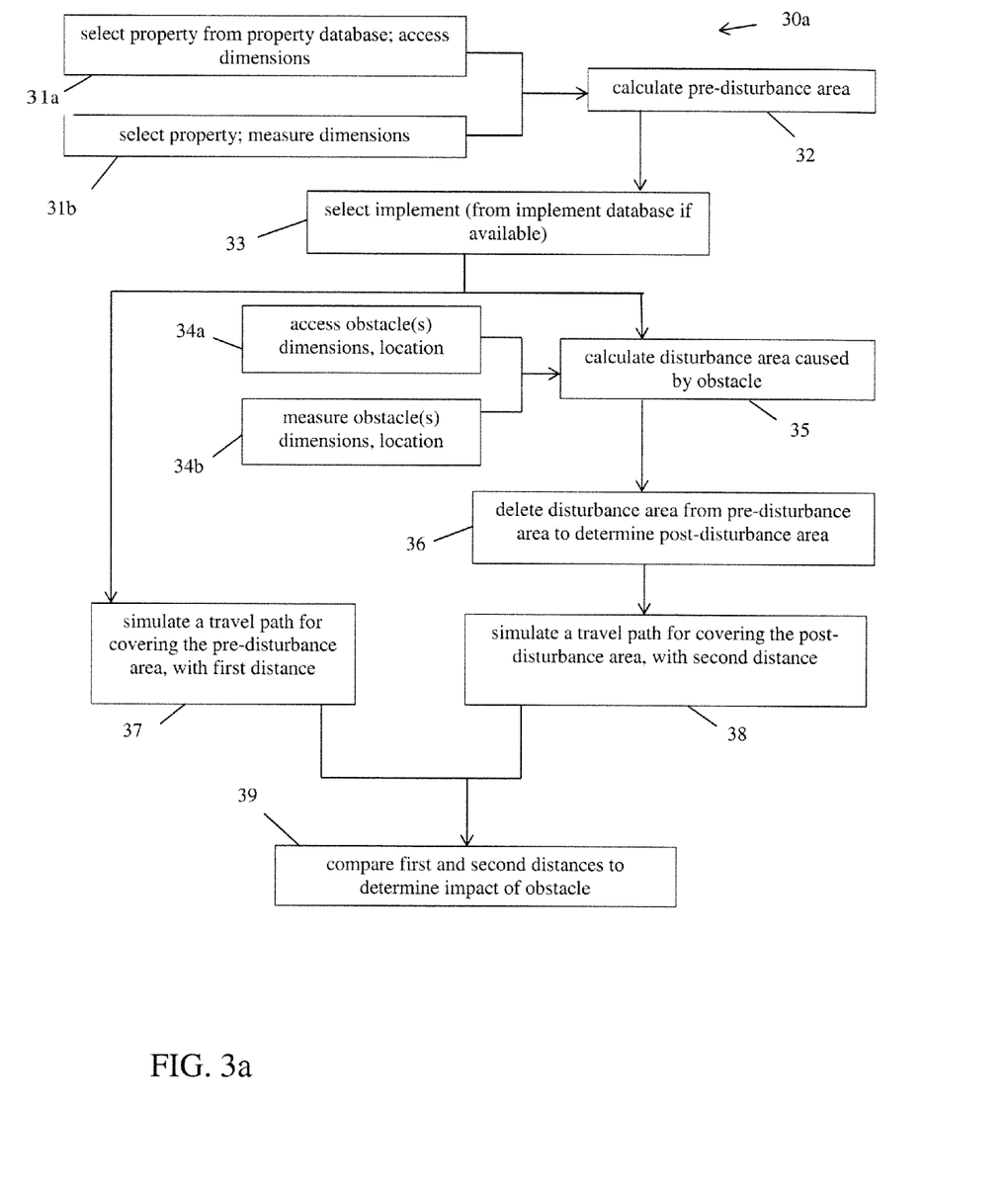
FIG. 3a is a flowchart illustrating a second method in accordance with the present invention.
Figure 3B:
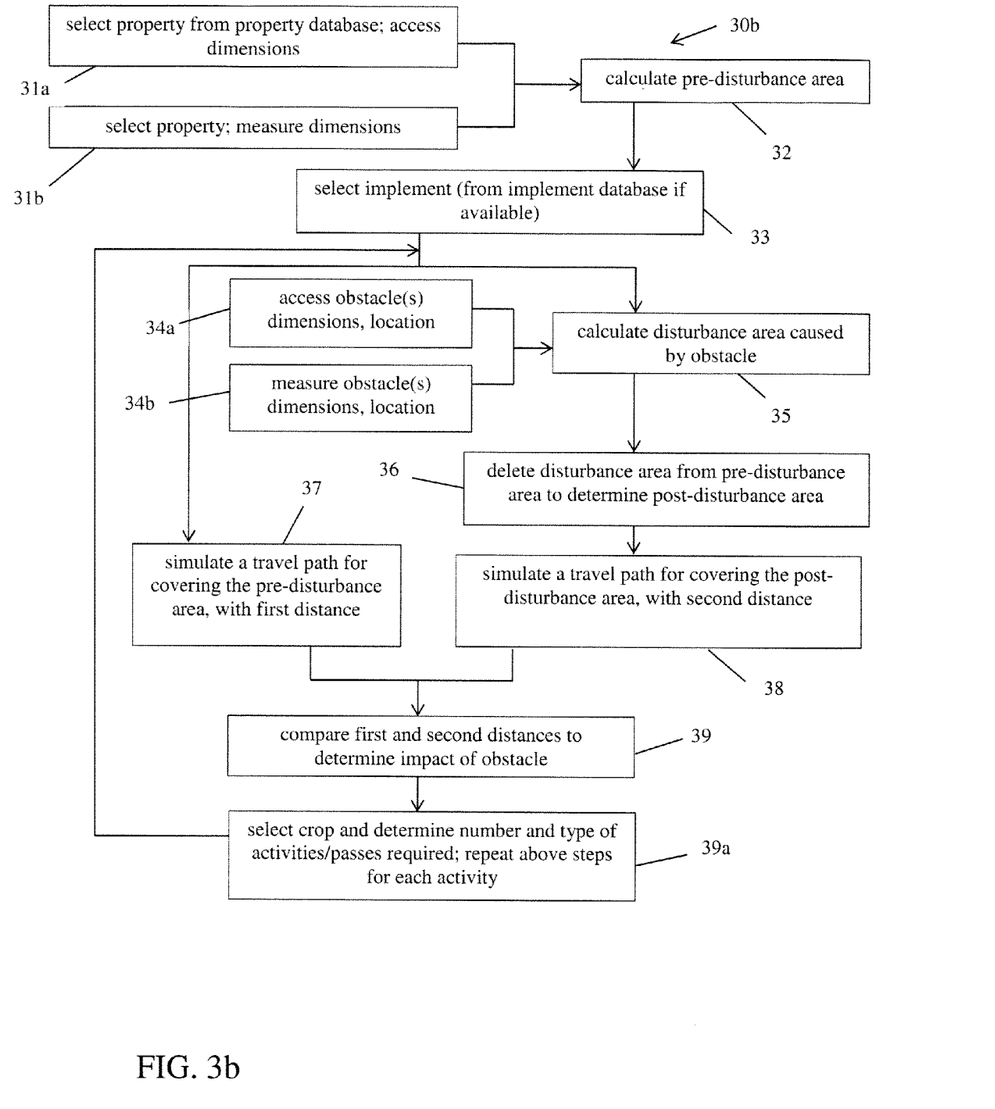
FIG. 3b is a flowchart illustrating a first modified form of the second method in accordance with the present invention.
Figure 3C:
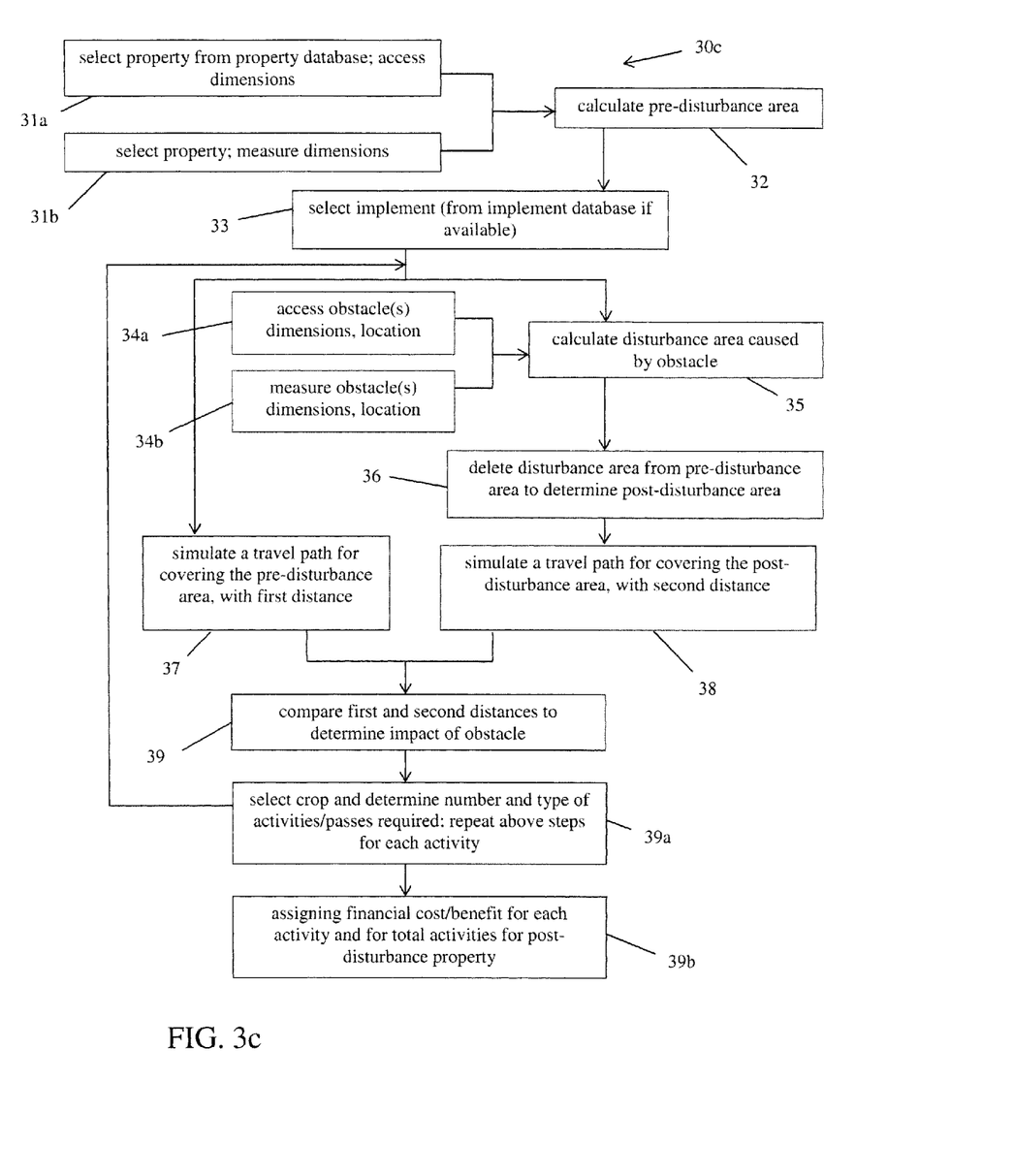
FIG. 3c is a flowchart illustrating a second modified form of the second method in accordance with the present invention.

Determining Impact of a Physical Obstacle on Agricultural Production from a Plot of Land While the above method focused on deter mining how to optimize the use of a selected implement on post-disturbance land, and specifically how to reduce the travel distance and therefore optimize production, FIGS. 3a, 3b and 3c illustrate related methods for determining the impact of the obstacle itself on production capabilities.

Referring now to FIG. 3a, a method 30a is illustrated which uses travel path simulations on pre-disturbance and post-disturbance land to enable a comparison of the travel paths as a means to assess obstacle impact on agricultural production. As with the above method 10, the method 30a begins with property selection (either from a database at step 31a or through direct measurement at step 31b) from which one can calculate a pre-disturbance area at step 32.

At step 33, an implement is selected in a similar way as described above with respect to method 10. Once the implement is selected, the method 30a bifurcates into two parallel simulation activities. First, a simulation activity is undertaken at step 37 which determines a travel path and related travel distance for the pre-disturbance area calculated at step 32. An example of such a travel path is illustrated in FIG. 2a. FIG. 2a illustrates an exemplary map or plan 20, which shows the property 21 under consideration and certain natural obstacles 22 present on the property 21. (Note that this plan 20 ignores the presence of the proposed pipeline right-of-way 23.) Based on the dimensions of the property 21, the size and position of the natural obstacles 22, and presence of headlands 24, a pre-disturbance travel path 25 is created (in the case of the illustrated example, by a software application). As can be seen, the travel distance for this example has been determined to be 41175.94 m, the distance that would be travelled by the selected implement in the absence of the man-made obstacle (the proposed pipeline right-of-way 23).

Second, another simulation activity is undertaken with consideration now given to the proposed man-made obstacle. The dimensions and proposed location of the man-made obstacle are acquired or located (by accessing a database at step 34a or by direct measurement at step 34b), such that a disturbance area caused by the obstacle can be calculated at step 35. After deleting this disturbance area from the pre-disturbance area to arrive at a post-disturbance area suitable for simulating agricultural activities at step 36, a second simulation activity takes place at step 38. This second simulation activity determines a travel path in the presence of the man-made obstacle, in this case the pipeline right-of-way 23. Turning to FIG. 2b, a plan 20 is illustrated showing a post-disturbance travel path and distance, which travel path works around the presence of the pipeline right-of-way 23. As can be seen on FIG. 2b, the travel distance for the implement is now 42275.97 m, an increase of approximately 1100 m. This increase would be noted at step 39 when the travel distances of the two simulations are compared, as would the fact that an increased travel distance—which will equate to increased input costs for production—is also required to farm a smaller productive land area, thereby providing quantifiable information regarding the impact of the obstacle on agricultural production from the selected property. Other impacts from the increased travel path, such as for example, increased land compaction from passage of the implement through increased overlaps, may also be noted as part of the impact.

While the above illustrates how the impact of an obstacle can be determined, it should be noted that an object of the present invention is to optimize agricultural activity in the presence of one or more obstacles, thereby attempting to mitigate inefficiencies and other undesirable results. For example, identifying a shortest possible travel path can help to reduce the volume of crop inputs that would otherwise be required to work around an obstacle, such crop inputs including fertilizers, pesticides, herbicides, insecticides and fungicides. This reduction in crop input volume would obviously have an economic impact on the agricultural operation, but it can also have a significant impact on environmental loading of the property. As is known to those skilled in the art, a field can be overloaded with crop inputs to the point of toxicity, and methods in accordance with the present invention can help to reduce the environmental load on the field.

Turning now to FIG. 3b, an additional factor is introduced in a modified method 30b for determining obstacle impact on agricultural production. As in well-known to those skilled in the art, a field is subjected to more than one agricultural activity. For example, a field may be subject in a single season to harrowing, seeding, spraying, swathing, combining and harvesting. To reflect this reality, FIG. 3b adds step 39a of selecting a particular crop to be grown on the field and determining the number and type of activities that will be required on the land for that type of crop. The method 30b then includes a looping of the simulation activities for each agricultural activity proposed for the selected crop. If, for example, three activities are anticipated during the growing season, the obstacle impact could essentially be tripled.

The fact that there is an impact on agricultural production will obviously have a financial or economic cost, and not simply from loss of certain previously farmable land. Where the travel distance is increased to address the presence of a man-made obstacle, there will be increases in input costs such as seed or fertilizer as well as implement fuel and labour costs. Turning to FIG. 3c, step 39b is undertaken to assign a financial cost/benefit for each activity and a total value for the post-disturbance property. This analysis may be of use in negotiating compensation for landowners in respect of loss of farmable land.

Determining an Optimized Agricultural Implement for Use on a Plot of Land

Figure 4:
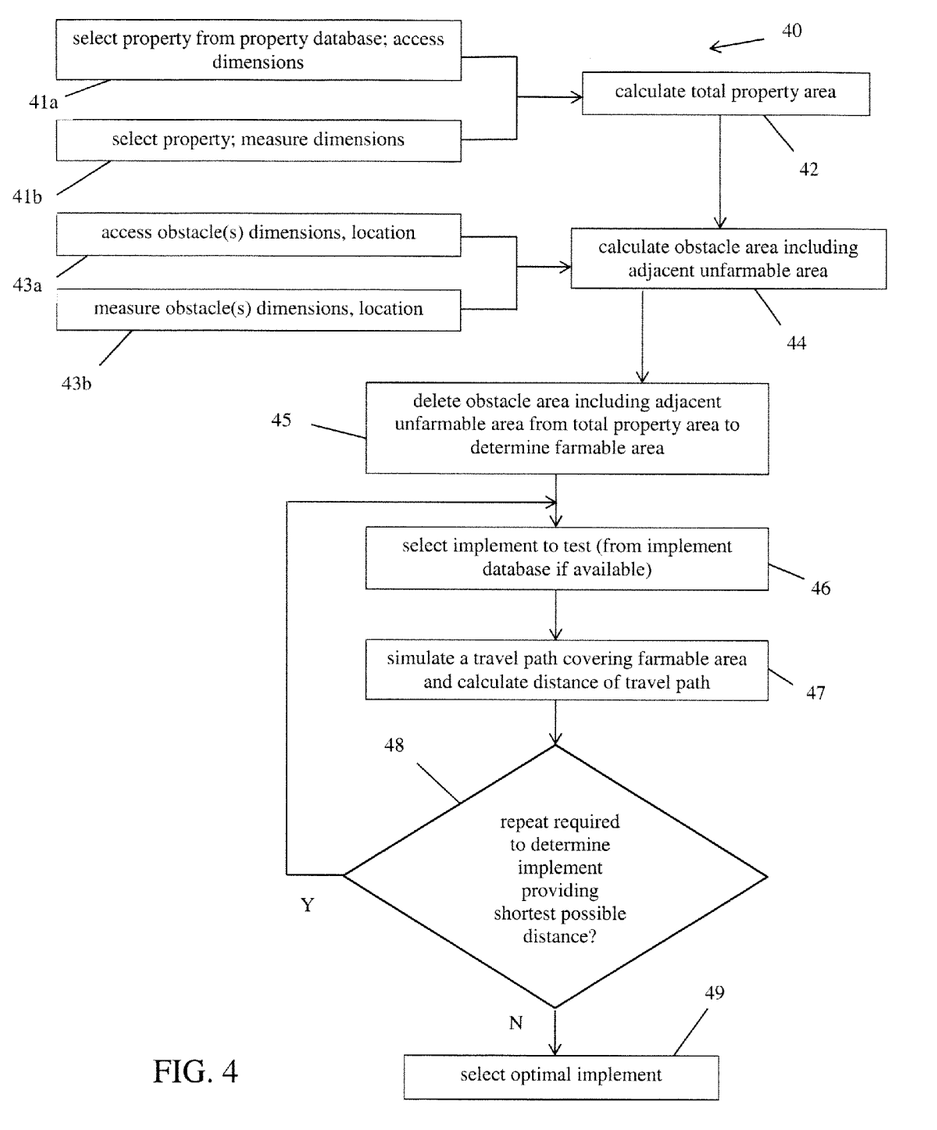
FIG. 4 is a flowchart illustrating a third method in accordance with the present invention.

While different travel paths can have an effect on obstacle impact on production from a target field, the size and type of implement employed can also have an effect. For example, a wider implement may normally be able to cover a field in fewer passes, but the size, irregularity and precise location of a man-made obstacle with respect to property boundaries or natural obstacles may generate inefficiencies with wider implements. Turning now to FIG. 4, a method 40 according to the present invention is directed to determining an optimized implement size and type for use in agricultural production for a target property comprising one or more physical obstacles. The method 40 begins with acquiring or locating information regarding the target property (dimension information, obtained at step 41a by accessing a database or through direct measurement at step 41b) and the obstacle or obstacles (dimension and location, again obtained through either database access at step 43a or measurement at step 43b). The total property area can be calculated at step 42 using the property information, and the obstacle area can be calculated at step 44 using the obstacle information. The farmable land subject of simulations is then determined by deleting the obstacle area from the total property area at step 45.

At step 46, a specific implement is selected for the simulation exercise. If a database is maintained with appropriate implement information, this can be accessed; otherwise, a manual selection is possible within the scope of the method 40. Once the implement is selected, a simulation can be run at step 47 in accordance with the within teaching to create a travel path covering the farmable area to the extent possible, and a calculation of the travel distance can then be undertaken.

A plurality of simulations can be run at step 48 to determine which implement provides the shortest travel distance in the presence of the obstacle(s), and at step 49 the implement with the shortest travel distance is selected as the optimal choice. It will be obvious to those skilled in the art that factors other than travel distance may require consideration and even be determinative in certain contexts, but this method 40 can be employed where a producer wishes to reduce input costs particularly in light of the loss of some otherwise productive farm land.

Determining an Optimized Position within an Agricultural Plot of Land for an Obstacle In each of the previous methods in accordance with the present invention, the location of the man-made obstacle was either known or had been planned but construction/installation had not yet been executed. The present invention also provides means for optimizing the position of such an obstacle on a target field, which can be useful for landowners when negotiating placement of an obstacle on their land.

Figure 5:
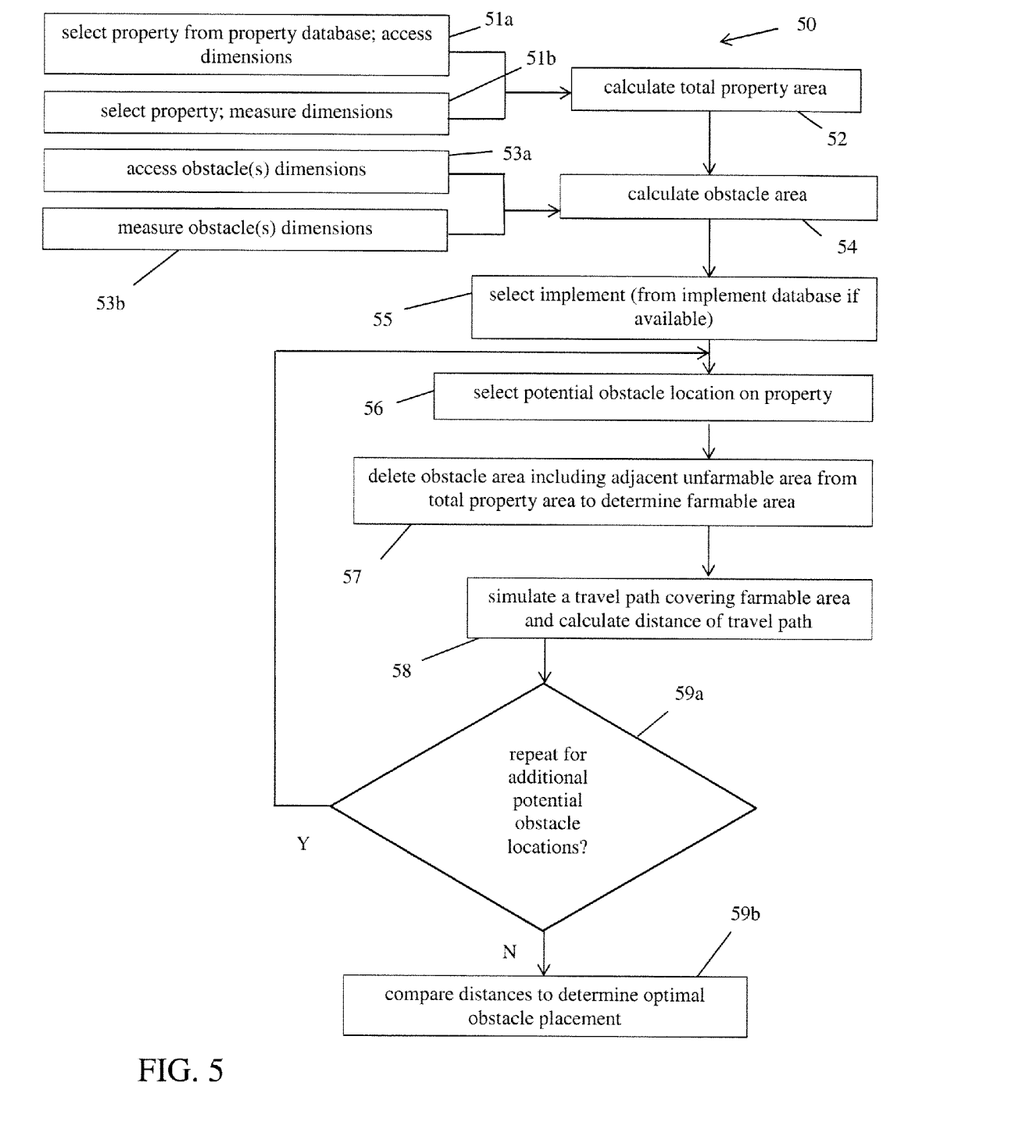
FIG. 5 is a flowchart illustrating a fourth method in accordance with the present invention.

Turning now to FIG. 5, a method 50 in accordance with the present invention begins with calculation of a total property area and an obstacle area in a manner akin to the description above, at steps 51a through 54. However, in this case only the dimensions of the obstacle are determined, not the location. An implement is then selected at step 55 in a manner described above.

At step 56, a potential location for the obstacle on the property is selected, and the obstacle area (including any adjacent unfarmable areas due to the nature of the obstacle and its proposed placement on the property) is deleted at step 57 from the total property area to arrive at a farmable area for simulation activities. A travel path is then simulated at step 58 that covers as much of the farmable land as possible given the obstacle placement and implement type, and a travel distance can then be calculated.

At step 59a, a decision is made regarding whether other obstacle locations should be tested, and the simulation activity can be repeated as desired. Travel distances for each simulation can be compared at step 59b, with a shortest travel distance being identified with the optimal obstacle placement. It is understood and acknowledged that other factors may require consideration when determining an obstacle placement, but reduced implement travel distance can provide one way to mitigate the potential negative impact on agricultural production from a target field.

The foregoing is considered as illustrative only of the principles of the invention. The scope of the claims should not be limited by the exemplary embodiments set forth in the foregoing, but should be given the broadest interpretation consistent with the specification as a whole.

What is claimed is:

1. A computer implemented method for determining an optimized travel path for an agricultural implement with respect to an agricultural field comprising an obstacle therein, the method comprising the steps of:
   a. selecting the agricultural field;
   b. identifying dimensions of an external boundary of the agricultural field, the external boundary of the agricultural field defining an agricultural field area;
   c. calculating dimensions of a boundary extent of the obstacle within the external boundary of the agricultural field and the location of the obstacle in the agricultural field, the boundary extent of the obstacle defining an obstacle area;
   d. determining a total area of the agricultural field outside the boundary extent of the obstacle that is available for agricultural activity, by subtracting the obstacle area from the agricultural field area;
   e. selecting an agricultural implement suitable for a desired type of agricultural activity on the agricultural field, the agricultural implement having defined operating parameters;
   f. determining at least two potential travel paths for the agricultural implement to traverse the entirety of the total area under the operating parameters, each potential travel path having a distance;
   g. selecting the potential travel path having the shortest distanced; and
   h. automatically controlling the agricultural implement based on the potential travel path having the shortest distance.

2. The method of claim 1 wherein the step of identifying the dimensions of the external boundary of the agricultural field is achieved by either primary measurement of the agricultural field or by accessing a record of pre-measured dimensions.

3. The method of claim 1 wherein the step of calculating the dimensions of the boundary extent of the obstacle is achieved by either primary measurement of the obstacle or by accessing a record of pre-measured dimensions.

4. The method of claim 1 wherein the step of determining the at least two potential travel paths for the agricultural implement to traverse the entirety of the total area comprises simulating a plurality of potential travel paths using computer software, the computer software configured to determine possible travel paths for a given area.

5. The method of claim 1 wherein the operating parameters of the agricultural implement include an anticipated overlap for adjacent rows of a travel path and an anticipated travel path width for the agricultural implement.

6. The method of claim 1 wherein the obstacle is at least one physical obstacle.

7. The method of claim 1 wherein the obstacle is a natural obstacle.

8. The method of claim 1 wherein the obstacle is a man-made obstacle.

9. The method of claim 1 wherein the obstacle area includes land adjacent the obstacle that is unfarmable with the selected agricultural implement given the location of the obstacle on the agricultural field.

10. The method of claim 1, further including the step of outputting a travel plan in the form of a hard copy map.

11. The method of claim 1, further including the step of outputting a set of electronic instructions suitable for use in navigating the agricultural implement.

* * * * *

UNITED STATES PATENT AND TRADEMARK OFFICE
CERTIFICATE OF CORRECTION

PATENT NO. : 9,933,787 B2
APPLICATION NO. : 14/264818
DATED : April 3, 2018
INVENTOR(S) : Lane Story Page 1 of 1

It is certified that error appears in the above-identified patent and that said Letters Patent is hereby corrected as shown below:

In the Claims

Column 10, Line 4, please replace "distanced" with ---distance---.

Signed and Sealed this
Fourteenth Day of August, 2018

Andrei Iancu
*Director of the United States Patent and Trademark Office*